United States Patent [19]
Lloyd et al.

[11] Patent Number: 5,008,014
[45] Date of Patent: Apr. 16, 1991

[54] SEPARATOR

[75] Inventors: David D. Lloyd, North Avon; Peter G. Michaluk, Gloucester, both of England

[73] Assignee: Serck Baker Limited, Gloucester, England

[21] Appl. No.: 469,405

[22] PCT Filed: Sep. 1, 1988

[86] PCT No.: PCT/GB88/00715
  § 371 Date: Mar. 27, 1990
  § 102(e) Date: Mar. 27, 1990

[87] PCT Pub. No.: WO89/02313
  PCT Pub. Date: Mar. 23, 1989

[30] Foreign Application Priority Data

Sep. 5, 1987 [GB] United Kingdom ............... 8720943
Sep. 5, 1987 [GB] United Kingdom ............... 8720944

[51] Int. Cl.⁵ ............................................ B01D 45/12
[52] U.S. Cl. ............................ 210/512.1; 209/144; 209/211
[58] Field of Search ............ 209/211, 144; 210/788, 210/512.1, 304

[56] References Cited

U.S. PATENT DOCUMENTS 2,346,005  1/1948  Bryson ........................... 210/51
4,378,289  3/1983  Hunter ........................... 209/211
4,414,112  11/1983 Simpson et al. ............... 210/512.1

FOREIGN PATENT DOCUMENTS 0058484   8/1982  European Pat. Off. .
0068809   1/1983  European Pat. Off. .
0132141   1/1985  European Pat. Off. .
0138475   4/1985  European Pat. Off. .
1642900   2/1971  Fed. Rep. of Germany .
3043729   6/1981  Fed. Rep. of Germany .
2588778   4/1987  France .
83/03063  9/1983  PCT Int'l Appl. .
86/07549  12/1986 PCT Int'l Appl. .
87/01968  4/1987  PCT Int'l Appl. .

OTHER PUBLICATIONS

English Translation of DE 3043729.
English Translation of DE 1642900.
English Translation of FR 2588778.

Primary Examiner—Frank Sever
Attorney, Agent, or Firm—Nixon & Vanderhye

[57] ABSTRACT

A separator for separating a relatively small volume e.g. up to 20% of a less dense liquid from a larger volume of a denser liquid, for example for separating small volumes of crude oil from produced water from an oil-well, in the form of an elongated tube of reducing cross-sectional area. The separator has at least one tangentially-disposed inlet (5, 105) for the mixture of liquids, adjacent the wide end of the separator, an outlet (10, 121) for the denser compartment at the narrow end, and an axially disposed outlet (11, 122) for the less dense component. A further outlet (6, 113) for the denser component may be provided intermediate the two ends. The two outlets (10, 121 or 6, 113) for the denser component are provided with pressure control means (85, 93) for controlling the pressure of the denser component.

51 Claims, 4 Drawing Sheets

SEPARATOR

This is a National Phase application based upon PCT/GB88/00715 filed Sept. 1, 1988.

This invention relates to a separator. In particular it relates to a separator for separating a relatively small volume e.g. up to 20% of a less dense liquid from a larger volume of a more dense liquid, for example separating small volumes of crude oil from production water from an oil well so that the separated water may be discharged in a virtually clean condition to the sea.

It is known to construct a separator for this use in tubular form of reducing circular cross-section from a wide end to a narrow end, having at least one tangentially-disposed inlet at or adjacent the wide end for introducing at relatively high velocity the mixture of liquids to be separated into the separator, and two outlets, the first disposed on the axis of the separator at the wide end for the removal of the less dense liquid component and the second disposed at or adjacent the narrow end for the removal of the more dense liquid component During use of such a separator the less dense component, for example oil, moves towards the axis and forms a core and this moves towards the wide end, while the more dense component, e.g. sea-water, moves towards the wall of the separator and towards the narrow end. However it has been found that in some situations not all the less dense component in the central core moves towards the wide end; some of it remains stationary and some even moves towards the narrow end where it mixes with and contaminates the more dense component.

It is an object of the present invention to provide a separator in which the above disadvantageous effects are substantially reduced or overcome.

In accordance with a first aspect of the invention a separator for separating a mixture of liquids into a more dense component and a less dense component comprises an elongated tube having a circular cross-section which reduces in diameter from a wide end to a narrow end, at least one tangentially disposed inlet at or adjacent the wide end for the introduction at relatively high velocity of a mixture of liquids to be separated, at least one outlet for the removal of the less dense component on the axis of the separator, and at least one outlet for the removal of the more dense component, positioned in the vicinity of the narrow end of the separator, and pressure control means for controlling the pressure of the more dense component in the vicinity of the outlet for the more dense component.

The tube may be of any suitable shape. For example it may be of constant taper from a location adjacent the inlet towards the narrow end. Alternatively the convergence angle may vary, either abruptly, so that the tube comprises a plurality of frusto conical portions, or gradually, so that the interior surface of the tube is curved, the degree of curvature decreasing in a direction from the wide end of the separator towards the narrow end. The tube may include at least one cylindrical section, e.g. at the wide end and/or at the narrow end.

The outlet for the more dense component may extend for at least substantially the whole of the circumference of the tube, or may comprise at least one tangentially disposed port of any suitable cross-sectional shape, e.g. circular, elliptical, rectangular or square in the opposite sense to the said at least one inlet. The size of the outlet may be adjustable. For example it may be in the form of a gap between the tube and an outlet unit, which may be moveable along the axis of the separator, to vary the size of the gap. The adjacent surfaces of the end of the tube and of the outlet unit defining the gap may be tapered, the cross-sectional area of a surface on either tube or outlet unit increasing from the wide end towards the narrow end of the separator.

At least one other, intermediate, outlet for the more dense component may be provided at a pre-determined position on the wall of the separator between the two ends, with pressure control means for controlling the pressure of the more dense component in the vicinity of this, intermediate, outlet for the more dense component. The intermediate outlet may extend for substantially the whole of the circumference of the tube, or may comprise at least one tangentially disposed port of any suitable cross-sectional shape, e.g. circular, elliptical, rectangular or square, in the opposite sense to the said at least one inlet. The size of the intermediate outlet may be adjustable, and the outlet may, in some situations, be closed. However, no change of diameter should occur. For example in the case where it extends around the whole circumference of the tube it may comprise a gap between two adjacent lengths of the tube, and the gap may be adjusted by moving one length relative to an adjacent length along the tube axis. The surfaces of the two adjacent lengths defining the gap may be tapered, the cross-sectional area of a wide surface on either length increasing in a direction from the wide end towards the narrow end of the separator.

Preferably there are two diametrically opposed tangential inlets for the mixture of liquids to be separated, of any suitable cross-sectional shape, e.g. circular, oval, rectangular or square. However more than two inlets may be provided. The or each inlet may connect with a cylindrical end section of the tube.

The size of either outlet for the more dense component, i.e. at the narrow end and/or between the two ends, or the inlet(s) may be controlled either manually or automatically under the influence of one or more sensors for detecting changes in various parameters such as liquid flow rate, liquid composition i.e. relative proportions of each component, or pressure at various positions.

The invention will now be described in more detail with reference to the accompanying drawings of which.

Figure 1:
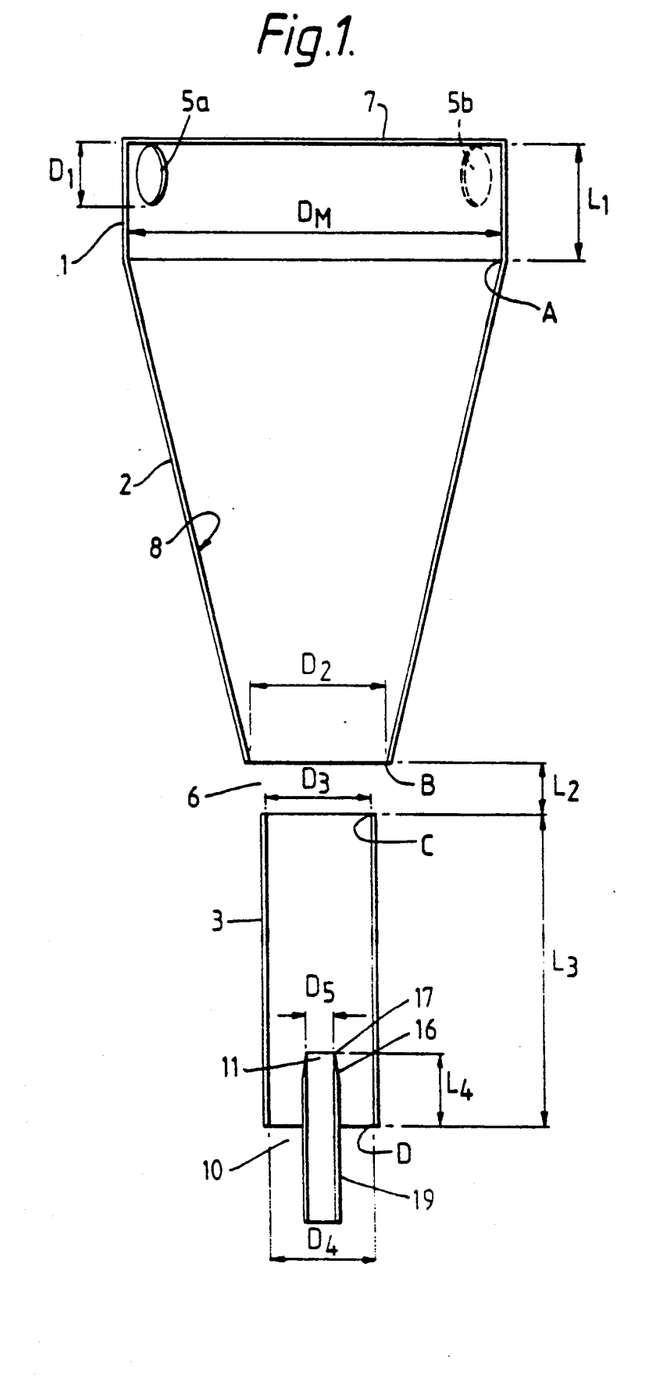
FIG. 1 shows a simplified longitudinal cross-section through a separator according to the invention.

A cyclone separator in accordance with the present invention is shown in FIG. 1 and comprises an elongated tube having a cylindrical inlet section 1, a first body section 2 and a second body section 3. The separator also comprises an outlet unit (see FIG. 9). For convenience the separator is shown with thin walls but in practice they may be much thicker to withstand internal pressures of the liquids being separated.

The inlet section 1, in the form of a short cylindrical tube, has a cross-sectional area $A_M$, and corresponding diameter $D_M$ in the range from about 20 mm to about 120 mm, typically about 70 mm, and a length L, up to about 500 mm. Preferably $L, = D_M$. Two diametrically opposed, tangentially disposed inlet ports 5a and 5b are provided, leading to the inlet section 1 from inlet pipes (not shown) through which a mixture of water and up to 20% crude oil may be fed at high velocity to the separator interior. The inlet section is provided with a disc-shaped end cover 7, which in this example is not provided with an axially disposed outlet for the less dense component. The inlet ports may be of any suitable cross-section, although in FIG. 1 the ports have a circular cross-section of diameter D,. The total cross-sectional area of the inlet ports A, may lie in the range given by the equation:

$$0.03 A_M \leq A, \leq 0.12 A_M \tag{1}$$

Preferably
$$0.045 A_M \leq A, \leq 0.09 A_M \tag{2}$$

The inlet section 1 is connected to the first body section 2 which as shown in FIG. 1 is of constant taper to provide the interior surface 8 with a constant convergence angle $\alpha$ between the point A where the inlet section joins the first body section and the point B where an intermediate outlet 6 for the more dense component is provided.

The convergence angle $\alpha$ preferably lies in the range from about 30' to about 10° e.g. about 2°, although smaller convergence angles are possible, down to about 1'-5', if the separator inlet diameter $D_M$ is small. A preferred value of $\alpha$ is 1.8°. At point B as shown in FIG. 1 the diameter $D_2$ of the separator has reduced to a value given by the equation:

$$\frac{D_M}{2} \geq D_2 \geq \frac{D_M}{8} \tag{3}$$

with a preferred value being $$\frac{D_M}{4}$$

Figure 2:
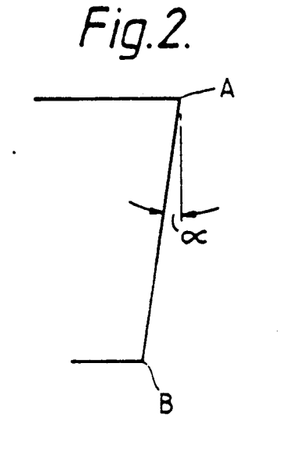
FIG. 2 shows how the angle $\alpha$ is defined.
Figure 4:
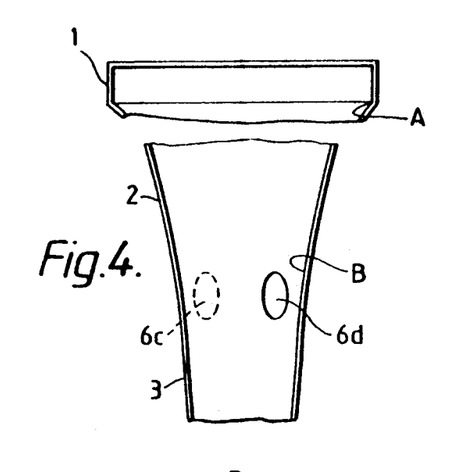

Other shapes of the first body section 2 are possible. For example the convergence angle may vary, either abruptly, so that the first body section 2 comprises a plurality of frusto-conical portions, the convergence angle decreasing from one portion to the next in a direction away from the inlet section 1, or gradually so that the interior surface 8 of the body section 2 is curved, the degree of curvature decreasing in a direction away from the inlet section 1, as illustrated in FIG. 4. In all the different shapes overall convergence angle $\alpha$ from point A to point B as illustrated in FIG. 2, lies within the range given above, and has the same preferred values.

As shown in FIG. 1 the separator is provided with an intermediate outlet 6 for the more dense component in the form of a circumferential gap between the first body section 1 and the second body section 3. Pressue conrol means for controlling the pressure of the more dense component in the vicinity of the intermediate outlet is provided but not shown in FIG. 1. Such means may comprise a pressure control valve. The size of the gap may be varied by moving the sections towards or away from one another so as to alter the longitudinal dimension $L_2$ shown in FIG. 1. Preferably the value of $L_2$ is defined by the equation:

$$\frac{D_M}{140} \leq L_2 \leq \frac{D_M}{7} \tag{4}$$

or, preferably $$\frac{D_M}{23} \leq L_2 \leq \frac{D_M}{9} \tag{5}$$

In this preferred range $L_2$ lies between 4.0 mm and 8.0 mm for a $D_M$ of about 70 mm.

As shown in FIG. 1 the second body section is cylindrical in shape and has an internal diameter $D_3$. The value of $D_3$ lies within the range given by the equation:

$$D_2 \geq D_3 \geq \frac{D_2}{2} \tag{6}$$

with a preferred value being:

$$D_3 = 0.8 \, D_2 \tag{7}$$

It is to be noted that if $D_3 < D_2$ then $L_2$ can be negative with the limit given by the equation:

$$L_2 = -D_M \tag{8}$$

In other words the end of the second body section 3 adjacent the gap 6 may protrude inside the interior of the first body section 2.

Figure 3:
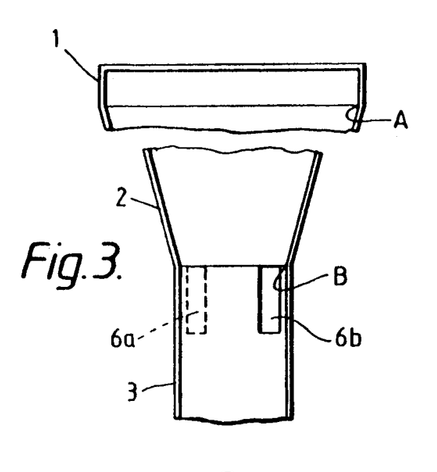
FIGS. 3–5 show in simplified form, three alternative constructions of part of the separator shown in FIG. 1.
Figure 5:
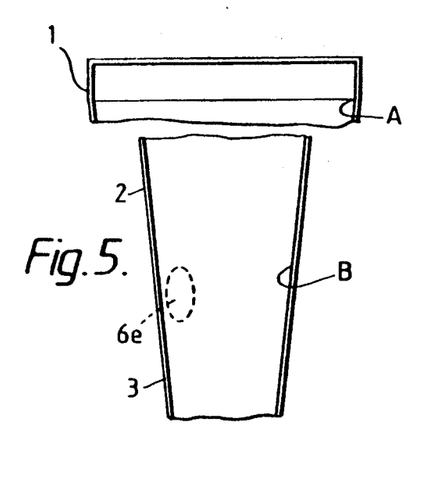

As shown in FIGS. 3, 4 and 5 alternatively the intermediate outlet 6 may comprise one or more outlet ports of any suitable cross-sectional shape. Two diametrically-opposed, tangentially disposed rectangular ports 6a and 6b are shown in FIG. 3, two diametrically disposed, tangentially disposed circular ports 6c and 6d are shown in FIG. 4 and one tangentially disposed circular port 6e is shown in FIG. 5. The second body section 3 in all constructions shown in FIGS. 3, 4 and 5 is a continuation of the first body section 2.

The total outlet area $A_3$ of the outlet port 6e or both outlet ports 6a and 6b or 6c and 6d may lie in the range given by the equation:

$$0.2 \, A_2 \leq A_3 \leq A_2 \tag{9}$$

Preferably two outlets are used with the preferred value being $$0.4 \, A_2 \leq A_3 \leq 0.8 \, A_2 \tag{10}$$

$A_2$ is the cross-sectional area of the tube at the point B in FIG. 1, and corresponds to the diameter $D_2$. This is the diameter immediately adjacent the intermediate outlet on the side closer to the wide end of the separator.

The arrangement of the outlet ports 6a, 6b etc. is in the opposite sense to the inlet ports 5a and 5b.

Figure 6:
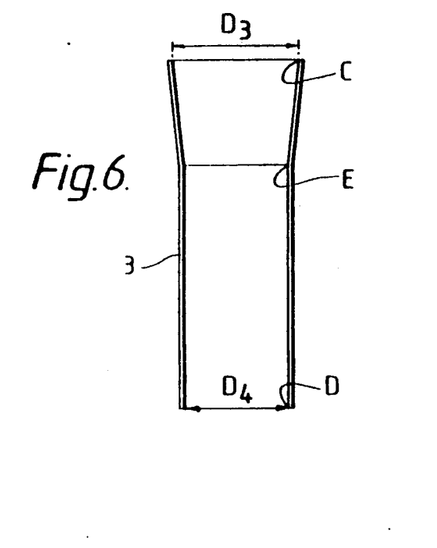
FIGS. 6 and 7 show, in simplified form, two alternative forms of the second body section of the separator shown in FIG. 1.
Figure 7:
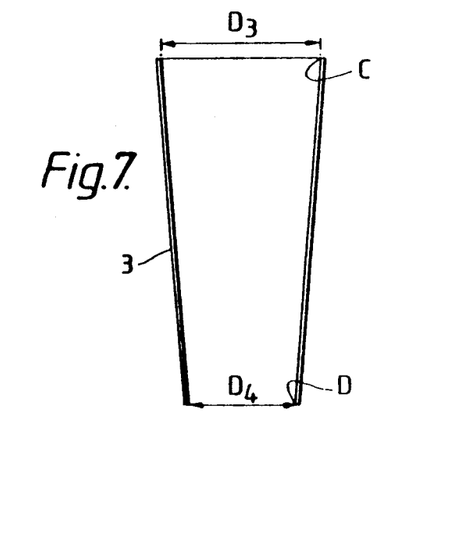
Figure 8:
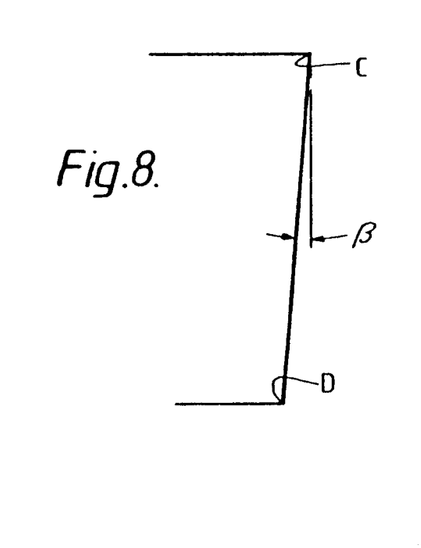
FIG. 8 shows how the angle $\beta$ is defined.

The second body section 3, as shown in the construction in FIG. 1 may be cylindrical. However, alternatively it may be formed with a frusto-conical mouth portion, as shown between points C and E in FIG. 6, the remainder being cylindrical, as shown between points E and D. Alternatively it may be curved as shown in FIG. 4, or of wholly frusto-conical form, as shown in FIG. 7. In all instances the overall angle of convergence $\beta$ between points C and D (see FIG. 8) lies in the range 0° to about 5°. The overall length $L_3$ of the second body section 3 lies in the range given by the equation:

$$D_M \leq L_3 \leq 14 D_M \tag{11}$$

But the values of $\beta$ and $L_3$ must be such that:

$$D_4 \leq 0.07 D_M \tag{12}$$

and $$D_3 \geq D_4 \tag{13}$$

Preferably the second body section 3 has a cylindrical shape so that $\beta = 0$ and $D_4 = D_3$, and also the value of $L_3$ is such that it lies in the range given by the equation;

$$5D_M \leq L_3 \leq 9D_M \tag{14}$$

with the preferred value of $L_3 = 7D_M$

Figure 9:
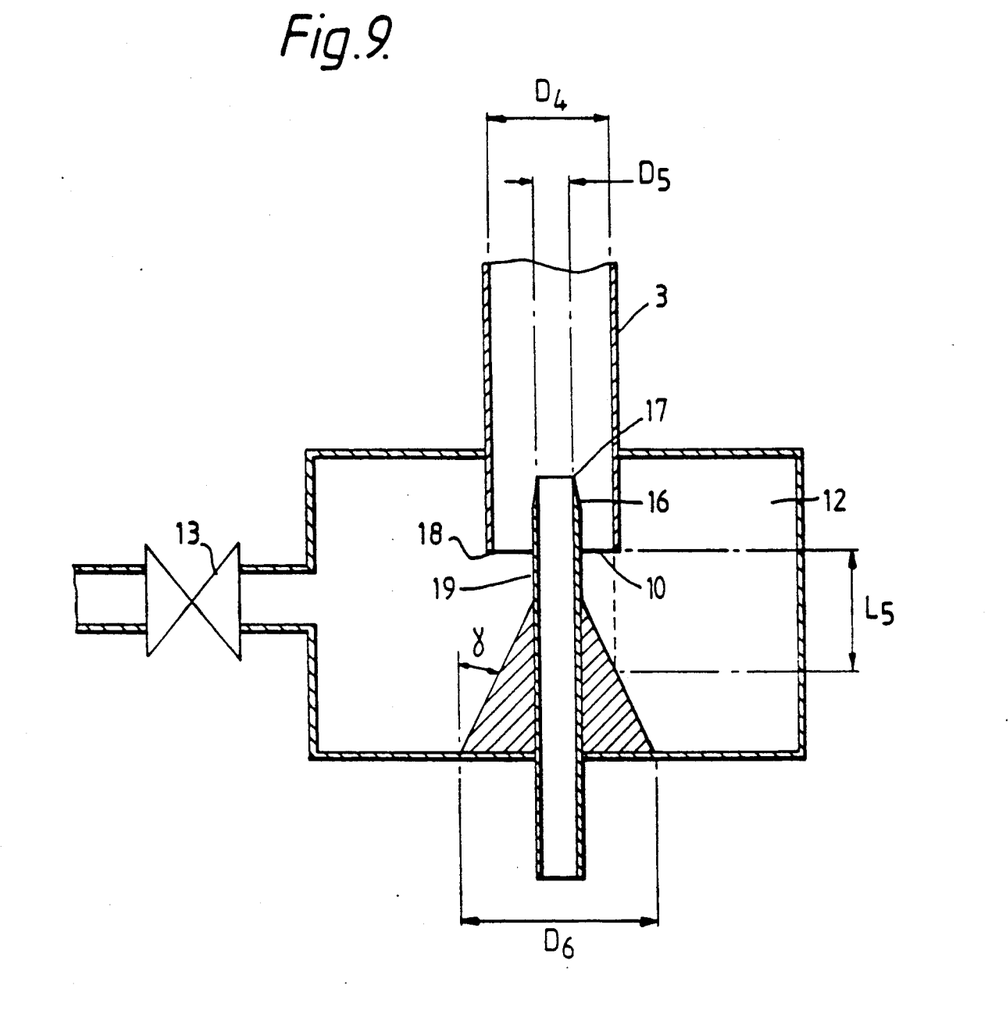
FIG. 9 shows, in simplified form, the construction of the separator shown in FIG. 1 at the narrow end thereof.

As shown in FIG. 9 the outlet 10 for the more dense component at the narrow end of the separator leads into a closed chamber 12. The component is fed from the chamber 12 through a restriction or other pressure control means such as a valve 13. The pressure of the outflowing component is thereby controlled. If several separators are used in parallel, the discharges of the more dense component may be into one chamber.

The outlet 10 shown in FIG. 9 extends around the whole circumference of the end of the second body section 3. Preferably the outlet is characterised by the axial width $L_5$ of the outlet, the taper angle $\gamma$ of the conical deflector 15 disposed in the chamber and the diameter $D_6$ of the base of the deflector. The values of these dimensions lie in the following preferred ranges $$5° \leq \gamma \leq 90° \tag{15}$$

$$\frac{D_M}{70} \leq L_5 \leq \frac{D_M}{3.5} \tag{16}$$

$$D_5 < D_6 < 4D_4 \tag{17}$$

However the maximum value of $D_6$ may be larger than $4D_4$. The upper limit depends on the size and shape of the chamber 12 or other practical limitations.

Alternatively the outlet 10 may be in the form of one or more tangentially disposed outlet ports of any suitable shape e.g. circular, rectangular or square, similar to the intermediate outlet ports 6a, 6b, 6c etc., and in the opposite sense the inlet ports 5a, 5b.

The less dense component of the mixture forms as a central core within the liquid and is removed from the separator via an axially disposed outlet 11 in the form of a narrow tube 19, the end of which is preferably tapered so as to form a sharp edge 17. The tube extends towards the interior of the separator beyond the extremity 18 of the second body section 3. The tube 19 may have an enlarged diameter outwardly from the separator beyond the extremity 18 of the second body section 3.

The internal diameter $D_5$ of the tube is selected depending on the proportions of the liquid components being separated but may be varied within the range given by the following equation:

$$0.9 D_4 \geq D_5 \geq 0.01 D_M \tag{18}$$

a preferred range (for low concentrations of the less dense component) being $$0.029 D_M \geq D_5 \geq 0.043 D_M \tag{19}$$

The length $L_4$ the tube 19 extends within the separator may be varied within the range:

$$0 \leq L_4 \leq L_3 \tag{20}$$

a preferred value being $$\frac{D_M}{4} \leq L_4 \leq 3D_M \tag{21}$$

Figure 10:
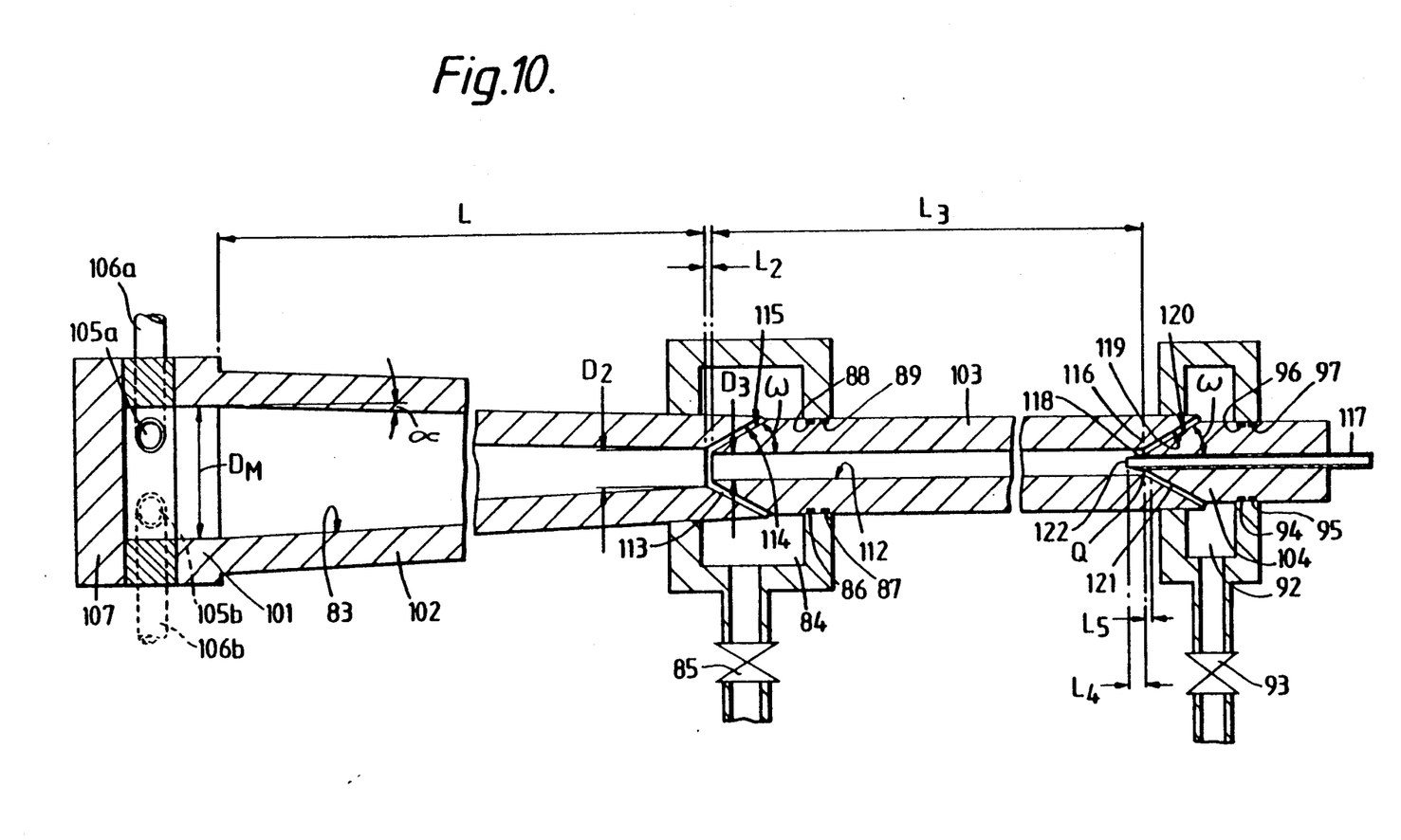
FIG. 10 shows a longitudinal cross-section through a cyclone separator in accordance with a specific embodiment of the invention.

One specific embodiment of the invention is shown in FIG. 10 and comprises a cyclone separator in the form of an elongated tube having a cylindrical inlet section 101, a first body section 102 and a second body section 103. The separator also comprises an outlet unit 104.

The inlet section 101 in the form of a short cylindrical tube having a diameter $D_M$ of 70 mm and a length $L, =50$ mm is provided with two tangentially disposed inlet ports 105a and 105b of circular cross-section diametrically opposed to one another leading from inlet pipes 106a and 106b through which a mixture of water and up to 2.0% crude oil may be fed at high velocity to the separator. The inlet section is provided with an end cover 107.

The inlet section 101 is connected to a tubular first body section 102 by any suitable means. The first body section 102 has a tapered interior having a frusto-conical surface 83, the convergence angle $\alpha$ of the surface 83 having a value of 1.8°. The length L of the first body section is 835 mm. The minimum diameter $D_2$ of the first body section is 17.5 mm.

At the end of the first body section 102 remote from the inlet section 101 is positioned a tubular second body section 103 having a cylindrical interior, i.e. the diameter of the interior surface 112 is constant. The diameter $D_3$ (=14 mm) of surface 112 of the second body section 103 is slightly less than the diameter $D_2$ (=17.5 mm) of frusto-conical surface 83 closest to the second body section 103, a small circumferential gap 113 being provided between the first body section 102 and the second body section 103. This gap 113 provides an outlet for the more dense component which discharges into a cylindrical chamber 84 surrounding the gap 113 and thence out through a pressure controlling valve 85. The position of the second body section 103 relative to the first body section 102 is adjustable by means (not shown in FIG. 1) to vary the size of the gap 113. Typically the axial length $L_2$ of the gap is between 1 mm and 10 mm. Two 0 ring seals 86, 87 are provided in grooves 88, 89 in the outer cylindrical surface of the first body section 102 allowing the first body section to slide in or out of the chamber 84 as required.

As can be seen in FIG. 10 the gap 113 is formed between a frusto-conical surface 114 on the end of the first body section 102 remote from the inlet section 101 and a conical surface 115 on the adjacent end of the second body section 103. The surfaces 114 and 115 are such that they diverge on a direction away from the inlet section 101 at a divergence angle W typically 30°.

The overall length $L_3$ of the second body section is 500 mm.

Adjacent the end 116 of the second body section 103 (i.e. at the narrow end of the separator) remote from the inlet section 101 there is positioned an outlet unit 104. This is in the form of a thick-walled tube within the bore of which is an inner tube 117 having an internal diameter in the range 2 mm–3 mm. This inner tube 117 is a sliding fit within the outlet unit 104, has a constant internal diameter in the range 4 mm–7 mm, and its axis coincident with the axis of the remaining parts of the separator. An elongation 118 of the inner tube 117 extends a short distance $L_4$ into the separator from the narrow end 116 thereof towards the inlet section 101, so that the inner tube mouth 122 is spaced apart from the narrow end 116. The mouth 122 of the tube is externally tapered to form a sharp edge at its extremity within the separator.

The surface 119 of the second body section 103 facing the outlet unit 104 is frusto-conical and the surface 120 of the outlet unit 104 facing the second body section 103 is conical. A small circumferential gap 121 is provided between the surfaces 119 and 120 to form a second outlet for the more dense component which discharges into a cylindrical chamber 91 surrounding the gap 121 and thence out through a pressure controlling valve 92. The surfaces 119 and 120 diverge in a direction away from the inlet section 1 at a divergance angle $\omega$ typically 30°.

The position of the outlet unit relative to the second body section 103 may be adjusted by means (not shown in FIG. 1) to vary the size of the gap 121. Typically the axial length $L_5$ of the gap is 0–10 mm e.g. 5 mm. Two O ring seals 94, 95 are provided in grooves 96, 97 in the outer cylindrical surface of the outlet unit 104, allowing it to slide into or out of the chamber 92 as required. Additionally suitable means may be provided for sliding the inner tube 117 within the outlet unit 104, thus varying the axial length $L_4$ (typically 80 mm) of the elongation 118 and hence moving the mouth 122 thereof to be positioned at any required distance from the narrow end 116 of the separator.

The mouth 122 of the inner tube 117 in the outlet unit 4 provides an outlet for the removal of the less dense component i.e. oil, from the separator. This inner tube 117 may be connected to a suitable valve and/or pump as required.

In use of the separator of this embodiment (as shown in FIG. 10) the mixture of liquids to be separated, water and crude oil, is fed at high speed into the separator through the inlet ports 105a and 105b. By adjusting the positions of the second body section 103 and the outlet unit 104 the sizes of the gaps 113 and 121 may be varied. Fluid flow and pressure are also varied. Since the less dense component i.e. the oil, moves towards the axis of the separator this may be removed through the mouth 122 of the inner tube 117. Additionally since the more dense component i.e. water, moves towards the wall of the separator i.e. the interior surfaces 83 and 112, some is removed through the gap 113 between the first and second body sections 102 and 103 (if open), while the remainder is removed through the gap 121 between the second body section 103 and the outlet unit 104. By suitable adjustment of the pressure of water by means of valves 85 and 93, of the flow rate of oil through the outlet 122, and of the relative positions of the second body section 103, the outlet unit 104 and the mouth 122, virtually clean water may be obtained from the outlets 113 or 121.

When the separator illustrated in FIG. 10 was operated to separate a mixture of about 400 parts per million of light oil (less dense component) in water (more dense component), the oil having a mean droplet diameter of 37 microns, the following results were achieved:

| At intermediate outlet | 94% of inlet oil removed |
|---|---|
| At outlet at narrow end | 96% of inlet oil removed |

The operating conditions were:

| Inlet Mixture | |
|---|---|
| Pressure | 50 psig (= 3.45 barg) |
| More dense component | |
| Intermediate outlet pressure | 38 psig (= 2.62 barg) |
| Intermediate outlet flow | 45 l/min |
| Narrow end outlet pressure | 28 psig (= 1.93 barg) |
| Narrow end outlet flow | 50 l/min |
| Less dense component | |
| Axial outlet pressure | About 1 psig (= 0.069 barg) |
| Axial outlet flow | About 2 to 3 l/min |
| Both components | |
| Total throughput | About 97–98 l/min |

It was also found that when a separator similar to that illustrated in FIG. 10 but with a slightly longer first body section 102 tapering to a minimum diameter $D_2$ of 14 mm i.e. equal to the internal diameter $D_3$ of the second body section 103, was operated under similar inlet pressure conditions but with the gap 113 between the first and second body sections closed the following results were obtained:

| More dense component | |
|---|---|
| At outlet at narrow end | 94.5% of oil removed |
| Both components | |
| Total throughput | About 70 l/min |

We claim:

1. A separator for separating a mixture of liquids into a more dense component and a less dense component comprises an elongated tube having a circular cross-section which reduces in diameter from a wide end means for enabling substantially all of the less dense component in the central core of said tube to be moved toward said narrow end, including to a narrow end, at least one tangentially disposed inlet at or adjacent the wide end for the introduction at relatively high velocity of a mixture of liquids to be separated, the tube having a constant taper from a location adjacent the inlet towards the narrow end, the convergence angle of the tube being about 2°, at least one outlet comprising an axially disposed tube extending into the separator at the narrow end thereof for the removal of the less dense component and at least one outlet for the removal of the more dense component, positioned in the vicinity of the narrow end of the separator, and pressure control means for controlling the pressure of the more dense component in the vicinity of the outlet for the more dense component.

2. A separator according to claim 1 wherein the size of the outlet for the removal of the more dense component is adjustable.

3. A separator according to claim 2 wherein the convergence angle is 1.8°.

4. A separator according to claim 2 wherein the width of the outlet, measured in an axial direction, lies in the range from $D_M/70$ to $D_M/3.5$, where $D_M$ is the internal diameter of the separator immediately adjacent the inlet.

5. A separator according to claim 1 wherein the outlet for the more dense component extends for at least substantially the whole circumference of the tube.

6. A separator according to claim 5 wherein the outlet is in the form of a gap between the tube and an outlet unit.

7. A separator according to claim 6 wherein the outlet unit is movable along the axis of the separator to vary the size of the gap.

8. A separator according to claim 6 wherein the surface of the outlet unit defining the gap is tapered, the cross-sectional area of the surface increasing from the wide end towards the narrow end of the separator.

9. A separator according to claim 8 wherein the taper angle $\gamma$ lies in the range 5° to 90°.

10. A separator according to claim 9 wherein the taper angle $\gamma$ is about 30°.

11. A separator according to claim 8 wherein the surface at the end of the tube defining the gap is tapered, and parallel to the surface of the outlet unit.

12. A separator according to claim 1 wherein the outlet for the more dense component comprises at least one tangentially-disposed port in the opposite sense to said at least one inlet.

13. A separator according to claim 1 wherein the tube for the removal of the less dense component is tapered so as to have a sharp edge within the separator.

14. A separator according to claim 1 wherein the tube for the removal of the less dense component has an enlarged diameter outwardly of the separator.

15. A separator according to claim 1 wherein the internal diameter of the tube for the removal of the less dense component is selected depending on the proportions of the liquid components to be separated.

16. A separator according to claim 1 wherein the internal diameter of the tube for the removal of the less dense component lies in the range $$0.9\ D_4 \geq D_5 \geq 0.01\ D_m$$

where
$D_4$ is the internal diameter of the separator at the narrow end,
$D_5$ is the internal diameter of the tube for the removal of the less dense component, and
$D_M$ is the internal diameter of the separator immediately adjacent the inlet.

17. A separator according to claim 16 wherein the internal diameter of the tube for the removal of the less dense component lies in the range $$0.029\ D_m \geq D_5 \geq 0.043\ D_M$$

for low concentration of the less dense component.

18. A separator according to claim 1 wherein the length of the tube for the removal of the less dense component which extends into the separator lies in the range:

$$E_{,uns}/D/\ M/4 \leq L_4 \leq 3\ D_M$$

wherein
$D_M$ is the internal diameter of the separator immediately adjacent the inlet, and
$L_4$ is the length of the tube for the removal of the less dense component which extends into the separator from the narrow end thereof.

19. A separator according to claim 1 comprising at least one other, intermediate, outlet for the more dense component at a predetermined position on the wall of the separator between the two ends, and pressure control means for controlling the pressure of the more dense component in the vicinity of the intermediate outlet for the more dense component.

20. A separator according to claim 19 wherein the size of the intermediate outlet for the removal of the more dense component is adjustable.

21. A separator according to claim 20 wherein the width of the intermediate outlet measured in an axial direction lies in the range:

$$\underline{D}_M/140 \leq L_2 \leq \underline{D}_M/7$$

where
$L_2$ is the width of the outlet, and
$D_M$ is the internal diameter of the separator immediately adjacent the inlet.

22. A separator according to claim 21 wherein the width of the outlet lies in the range:

$$\underline{D}_M/23 \leq L_2 \leq \underline{D}_M/9$$

23. A separator according to claim 19 wherein the intermediate outlet for the more dense component extends for at least substantially the whole circumference of the tube.

24. A separator according to claim 23 wherein the intermediate outlet is in the form of a gap between adjacent lengths of the tube.

25. A separator according to claim 24 wherein at least one of the lengths of the tube is movable relative to the adjacent length to vary the size of the gap.

26. A separator according to claim 24 wherein the intermediate outlet may be closed by bringing the two adjacent lengths into contact, the internal diameter of each tube length immediately adjacent the outlet being equal.

27. A separator according to claim 24 wherein the surfaces of the adjacent lengths defining the gap are parallel and tapered, the cross-sectional area of each surface increasing from the wide end towards the narrow end of the separator.

28. A separator according to claim 27 wherein the taper angle $\omega$ lies in the range 5° to 90°.

29. A separator according to claim 27 wherein the taper angle $\omega$ is about 30°.

30. A separator according to claim 19 wherein the intermediate outlet for the more dense component comprises at least one tangentially-disposed port in the opposite sense of said at least one inlet.

31. A separator according to claim 19 wherein the angel of convergence, $\alpha$, independent of the shape of the tube, between the position A where the internal diameter starts to reduce and the position B immediately adjacent the intermediate outlet for the more dense component closer to the wide end is about 2°.

32. A separator according to claim 19 wherein the angle of convergence, α, independent of the shape of the tube, between the position A where the internal diameter starts to reduce and the position B immediately adjacent the intermediate outlet for the more dense component closer to the wide end is 1.8°.

33. A separator according to claim 1 wherein the tube comprises two lengths, the first length being tapered and positioned nearer the wide end and the second length being positioned nearer the narrow end, a closeable intermediate outlet for the removal of the more dense component being positioned between the two lengths.

34. A separator according to claim 33 comprising a cylindrical inlet section immediately adjacent the inlet.

35. A separator according to claim 33 wherein the convergence angle α of the first length is about 2°.

36. A separator according to claim 33 wherein the convergence angle α of the first length is 1.8°.

37. A separator according to claim 33 wherein the total cross-sectional area of the at least one inlet lies in the range:

$$0.03\, A_M \leq A_1 \leq 0.12\, A_M$$

where
$A_1$ is the total cross-sectional area of said at least one inlet and
$A_M$ is the cross-sectional area of the separator immediately adjacent said at least one inlet.

38. A separator according to claim 33 wherein the total cross-sectional area of the at least one inlet lies in the range:

$$0.045\, A_M \leq A_1 \leq 0.09\, A_M$$

where
$A_1$ is the total cross-sectional area of said at least one inlet and
$A_M$ is the cross-sectional area of the separator immediately adjacent said at least one inlet.

39. A separator according to claim 33 wherein the minimum diameter of the first length lies in the range one half to one eighth of the maximum diameter ($D_M$).

40. A separator according to claim 39 wherein the minimum diameter of the first length is about one quarter of the maximum diameter.

41. A separator according to claim 33 wherein the internal diameter of the second length adjacent the intermediate outlet is substantially equal to the minimum diameter of the first length.

42. A separator according to claim 33 wherein the internal diameter of the second length is constant and lies within the range:

$$D_2 \geq D_3 \geq E,\text{uns}/D/\,\gamma/2$$

where
$D_2$ is the minimum internal diameter of the first length and,
$D_3$ is the internal diameter of the second length.

43. A separator according to claim 42 wherein $$D_3 = 0.8\, D_2.$$

44. A separator according to claim 33 wherein the second length is internally tapered over at least part of its length, the maximum diameter being immediately adjacent the intermediate outlet and the angle of taper having a value up to about 5°.

45. A separator according to claim 33 wherein the overall length of the second length lies in the range:

$$D_M \leq L_3 \leq 14\, D_M$$

where
$D_M$ is the maximum internal diameter of the separator and
$L_3$ is the overall length of said second length,
but the following conditions apply:

$$D_4 \geq 0.07\, D_M$$

and $$D_3 \geq D_4$$

where
$D_3$ is the internal diameter of the second length adjacent intermediate outlet and,
$D_4$ is the internal diameter of the second length adjacent the outlet at the narrow end.

46. A separator according to claim 33 wherein the overall length of the second length lies in the range:

$$5\, D_M \leq L_3 < 9\, D_M$$

where
$L_3$ is said overall length of the second length and,
$D_M$ is the maximum internal diameter of the first length.

47. A separator according to claim 33 wherein the overall length of the said second length equals seven times the maximum internal diameter of the first length.

48. A separator according to claim 33 wherein the outlet for the more dense component at the narrow end of the separator extends around the whole circumference of the separator, the axial width of the outlet lying in the range:

$$E,\text{uns}/D/\,{}_M/70 \leq L_5 < \underline{D}_M/3.5$$

where
$L_5$ is the axial width and,
$D_M$ is the maximum diameter of the first length.

49. A separator according to claim 48 wherein the outlet for the more dense component at the narrow end of the separator comprises a conical deflector having a taper angle in the range from 5° to 90°.

50. A separator according to claim 33 wherein the outlet for the less dense component comprises an axially disposed tube at the narrow end of the separator which extends into the second length for a variable distance upon to the overall length of the second length.

51. A separator according to claim 50 wherein the distance the tube extends into the second length lies in the range:

$$\underline{D}_M/4 \leq L_4 \leq 3\, D_M$$

where
$D_M$ is the maximum internal diameter of the first length,
$L_4$ is the said distance.

* * * * *